United States Patent
Alfermann et al.

(10) Patent No.: US 8,181,333 B2
(45) Date of Patent: May 22, 2012

(54) METHOD OF MANUFACTURING SQUIRREL-CAGE ROTOR

(75) Inventors: Timothy J. Alfermann, Noblesville, IN (US); Arthur L. McGrew, Jr., Indianapolis, IN (US); Ahmed M. El-Antably, Carmel, IN (US)

(73) Assignee: GM Global Technology Operations LLC

( * ) Notice: Subject to any disclaimer, the term of this patent is extended or adjusted under 35 U.S.C. 154(b) by 94 days.

(21) Appl. No.: 12/407,210

(22) Filed: Mar. 19, 2009

(65) Prior Publication Data

US 2010/0007234 A1    Jan. 14, 2010

Related U.S. Application Data

(60) Provisional application No. 61/079,192, filed on Jul. 9, 2008.

(51) Int. Cl.
*H02K 15/00* (2006.01)
*H02K 15/09* (2006.01)
*H02K 17/16* (2006.01)

(52) U.S. Cl. .............. 29/598; 310/125; 310/211
(58) Field of Classification Search .............. 29/598; 310/125, 156.78, 211, 261, 261.1
See application file for complete search history.

(56) References Cited

U.S. PATENT DOCUMENTS

| 2,784,333 | A | * | 3/1957 | Gunselman | 310/211 |
| 5,990,595 | A | * | 11/1999 | Crowell | 310/216.109 |
| 7,791,240 | B2 | * | 9/2010 | Alfermann et al. | 310/166 |

FOREIGN PATENT DOCUMENTS

| EP | 1347560 A1 | 9/2003 |
| EP | 1347560 A1 * | 9/2003 |
| JP | 54054209 A * | 4/1979 |

OTHER PUBLICATIONS

Full Translation of JP54054209A, 13 pages.*

* cited by examiner

*Primary Examiner* — Livius R Cazan

(57) ABSTRACT

A method of manufacturing a squirrel-cage rotor includes: providing a laminated stack; attaching a plurality of rotor bars to the laminated stack, wherein the plurality of rotor bars each include opposite longitudinal ends; and die-casting a pair of end rings at the longitudinal ends of the plurality of rotor bars.

1 Claim, 6 Drawing Sheets

METHOD OF MANUFACTURING SQUIRREL-CAGE ROTOR

CROSS-REFERENCE TO RELATED APPLICATIONS

This application claims the benefit of U.S. Provisional Application No. 61/079,192, filed on Jul. 9, 2008. The disclosure of the above application is incorporated herein by reference.

FIELD

The present disclosure relates to electric induction machines, and more particularly to methods of manufacturing squirrel-cage rotors for electric motors.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Squirrel-cage rotors for electric induction machines may include a laminated stack that defines a plurality of elongated slots. A plurality of rotor bars are provided in the elongated slots. A pair of end rings are provided at opposite ends of the laminated stack. To manufacture the squirrel-cage rotor, the laminated stack is placed in a set of molds that define cavities for forming the end rings. The cavities communicate with the elongated slots. A casting material is injected into the set of molds and fills in the cavities to form the end rings and the elongated slots to form the rotor bars.

Die-casting the rotor bars and the end rings concurrently in the same set of molds increases the complexity of the molding process. For example, shrinkage holes may be formed in the interior of the elongated slots and the end rings. The shrinkage holes affect integrity of the rotor bars and the end rings. Further, die-casting the rotor bars and the end rings in the same set of molds is more expensive and die wear generally occurs when the die-cast rotor assembly is removed from the molds.

SUMMARY

Accordingly, a method of manufacturing a squirrel-cage rotor includes: providing a laminated stack; attaching a plurality of rotor bars to the laminated stack, wherein the plurality of rotor bars each include opposite longitudinal ends; and die-casting a pair of end rings at the longitudinal ends of the plurality of rotor bars.

A squirrel-cage rotor includes a laminated stack, a plurality of rotor bars, and a pair of end rings. The plurality of rotor bars are attached to the laminated stack and are made of a first material. The pair of end rings are attached to longitudinal ends of the laminated stack and are made of a second material. The second material is a casting material. The first material is different from the second material.

In other features, the laminated stack includes a plurality of steel sheets. The plurality of rotor bars are extruded and include aluminum alloy 6101. The end rings are produced by die-casting aluminum alloy 6061.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
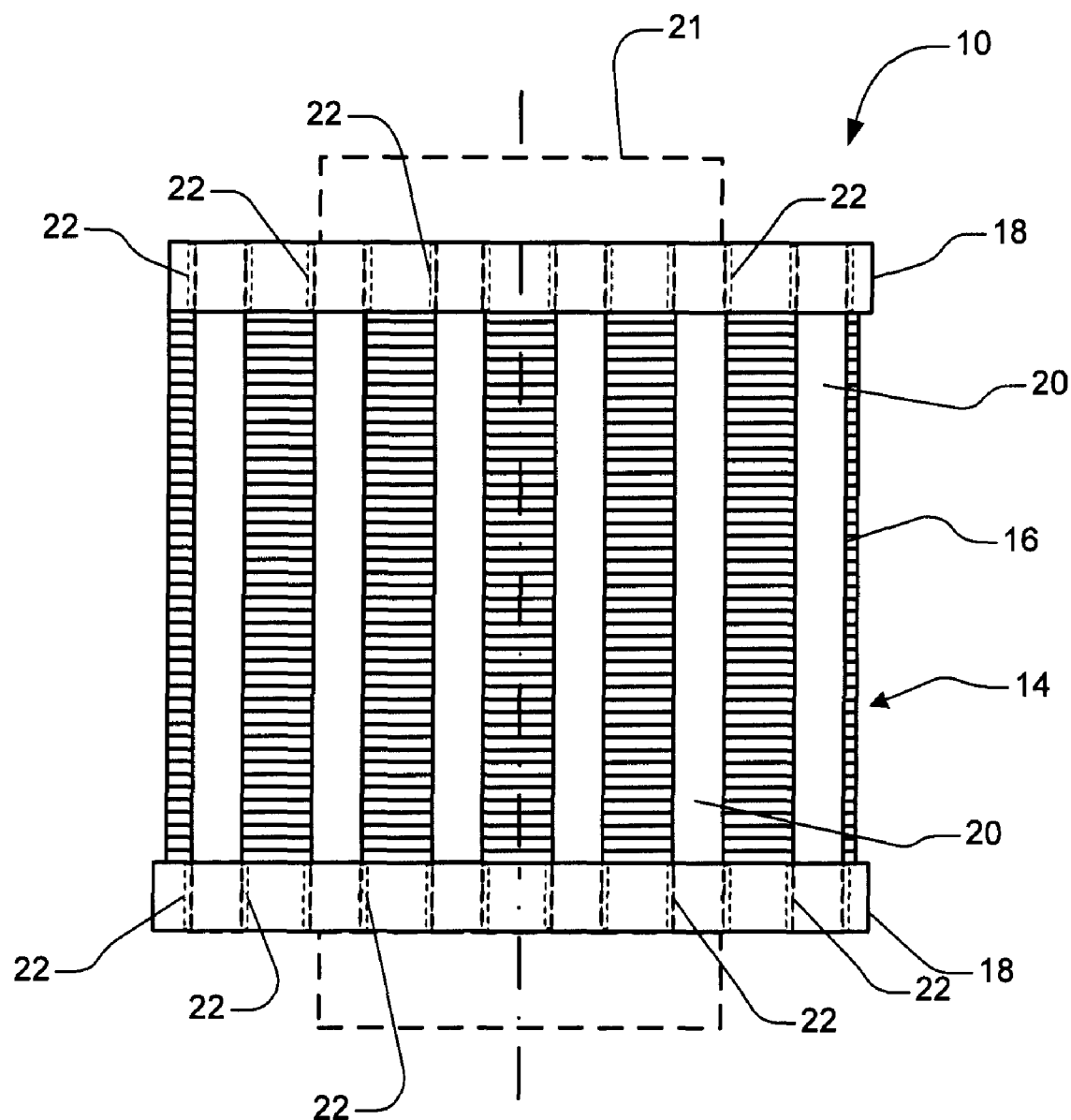
FIG. 1 is a plan view of a squirrel-cage rotor in accordance with the teachings of the present disclosure.

The following description of the preferred embodiment is merely exemplary in nature and is in no way intended to limit the invention, its application, or uses. For purposes of clarity, the same reference numbers will be used in the drawings to identify similar elements.

A method of manufacturing a squirrel-cage rotor in accordance with the teachings of the present disclosure includes inserting a plurality of preformed rotor bars to a laminated stack, followed by die-casting the end rings. The rotor bars and the end rings are manufactured by different manufacturing methods, resulting in increased selection of available materials and reduced molding expenses.

Figure 2:
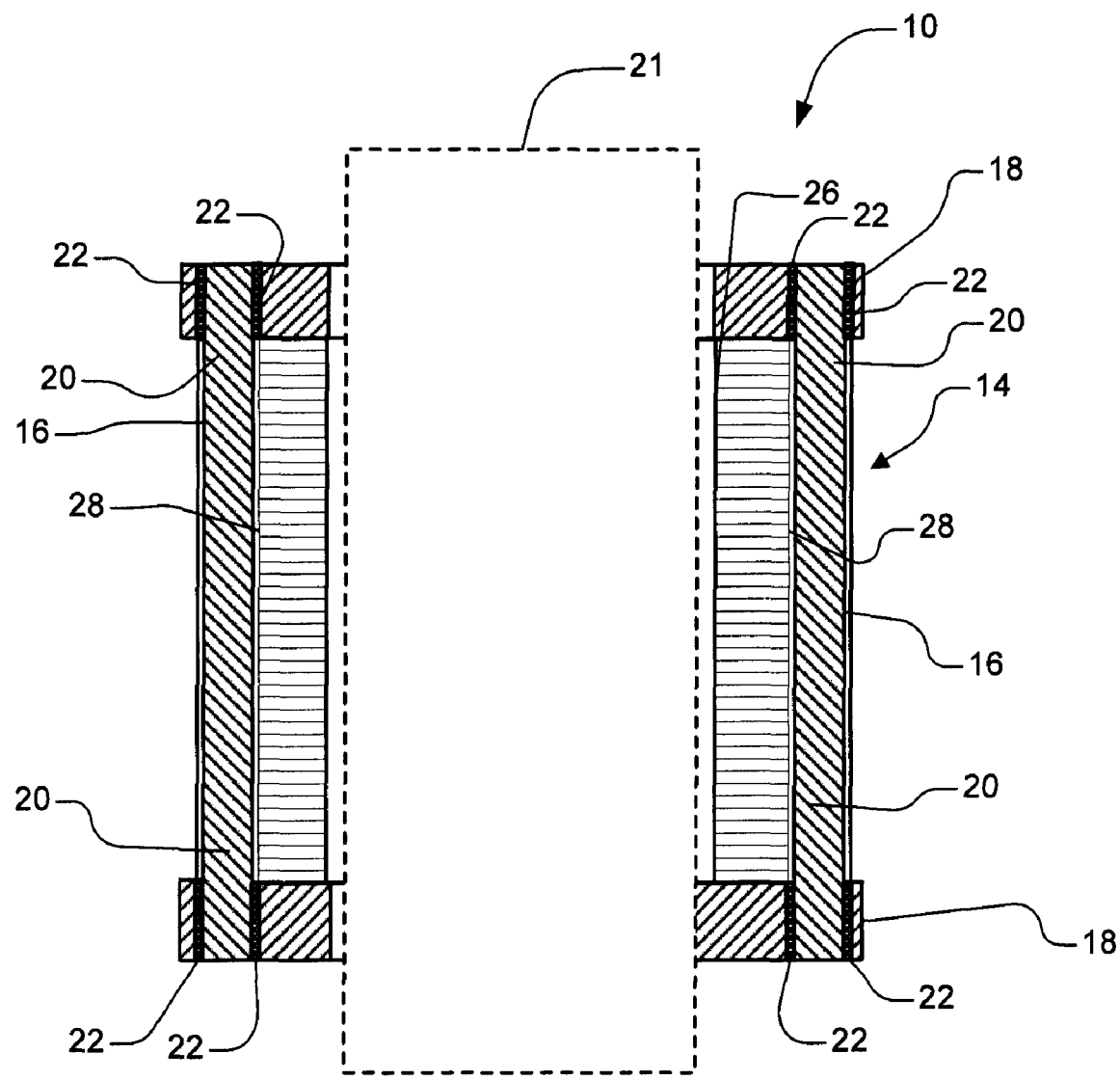
FIG. 2 is a cross-sectional view of a squirrel-cage rotor in accordance with the teachings of the present disclosure.

Referring now to FIGS. 1 and 2, an exemplary squirrel-cage rotor 10 for an electric induction machine includes a laminated stack 14, a plurality of rotor bars 16 inserted into the laminated stack 14, and a pair of end rings 18 provided at longitudinal ends of the laminated stack 14. The laminated stack 14 may be mounted around a rotatable shaft 21. The rotor bars 16 include longitudinal ends 20 that protrude beyond the longitudinal ends of the laminated stack 14 and that are inserted into the end rings 18. The laminated stack 14 abuts against the end rings 18. Weld joints 22 are formed at interfaces between the rotor bars 16 and the end rings 18. For example only, the weld joints 22 may be formed at peripheries of the rotor bars 16 adjacent to the end rings 18 and along the entire surfaces of the rotor bars 16 inside the end rings 18.

Figure 3:
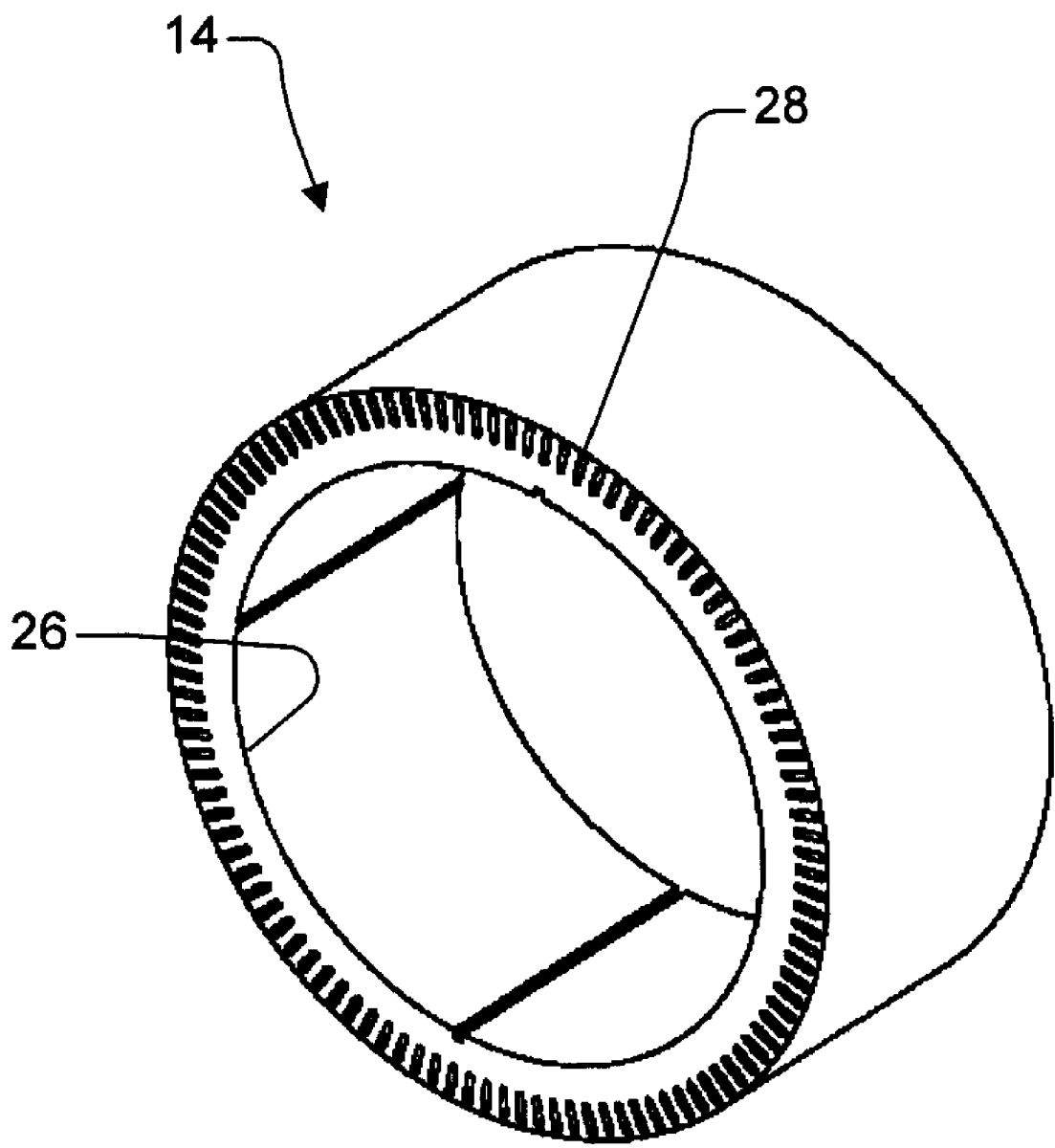
FIG. 3 is a perspective view of a laminated stack of a squirrel-cage rotor in accordance with the teachings of the present disclosure.

Referring to FIG. 3, the laminated stack 14 includes a central slot 26 and a plurality of elongated slots 28. The rotatable shaft 21 may be inserted into the central slot 26. The elongated slots 28 are provided adjacent to the periphery of the laminated stack 14 and may extend axially along the entire length of the laminated stack 28. The elongated slots 28 may extend in a direction parallel to a central axis of the laminated stack 14. Alternatively, the elongated slots 28 may be skewed relative to the end rings 18. The plurality of rotor bars 16 are inserted into the elongated slots 28.

Figure 4:
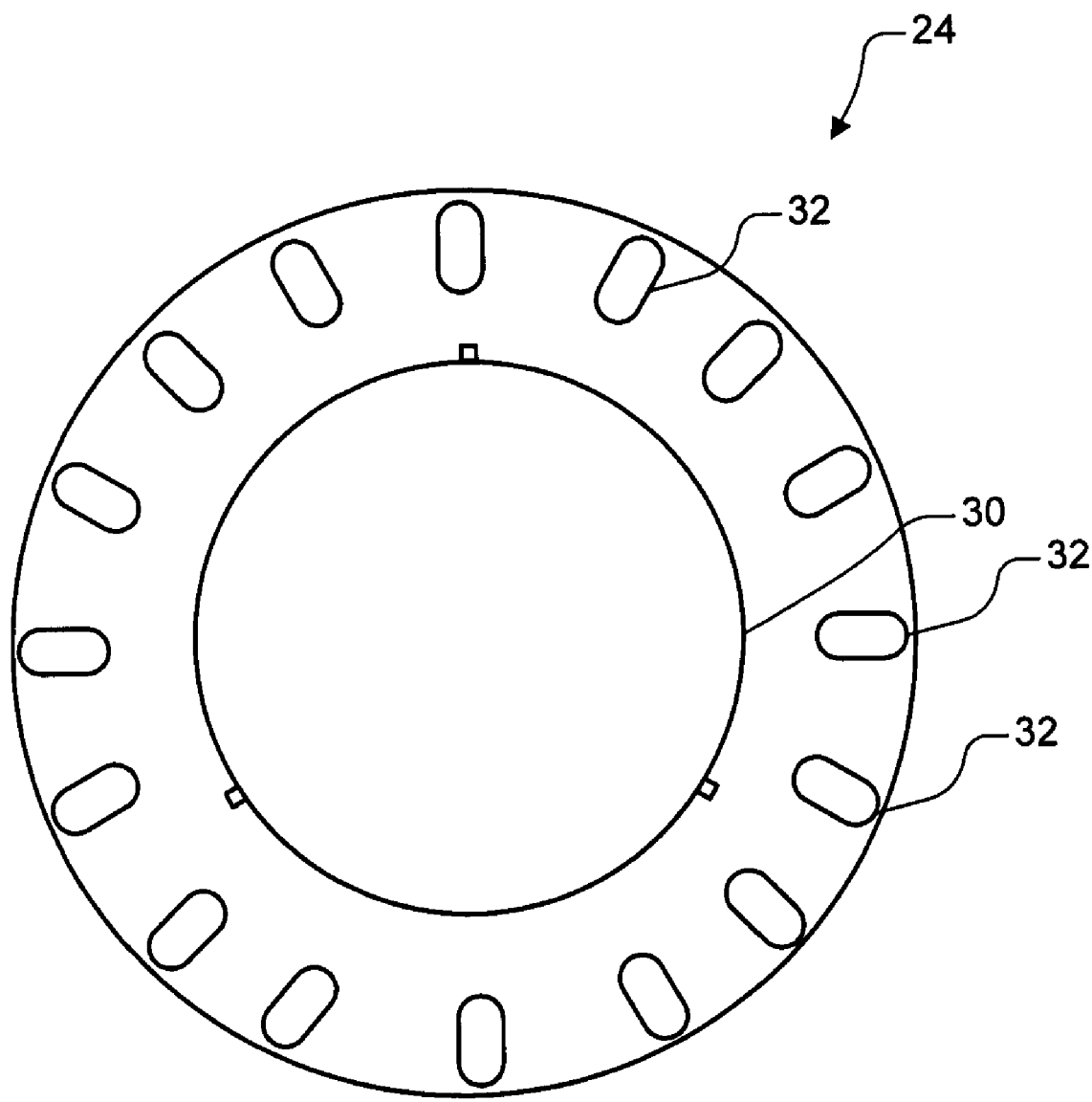
FIG. 4 is a top view of a metal sheet of a squirrel-cage rotor in accordance with the teachings of the present disclosure.

Referring to FIG. 4, the laminated stack 14 includes a plurality of metal sheets 24 that are made of, for example only, steel. The plurality of metal sheets 24 are laminated along the central axis of the laminated stack 14 and each have a central opening 30 and a plurality of peripheral apertures 32. The central openings 30 of the plurality of metal sheets 24 jointly define the central slot 26 for the rotatable shaft 21. The plurality of apertures 32 are circumferentially spaced apart and jointly define the elongated slots 28. The peripheral apertures 32 may have a shape and size conforming to the shape and size of the rotor bars 16.

Figure 5:
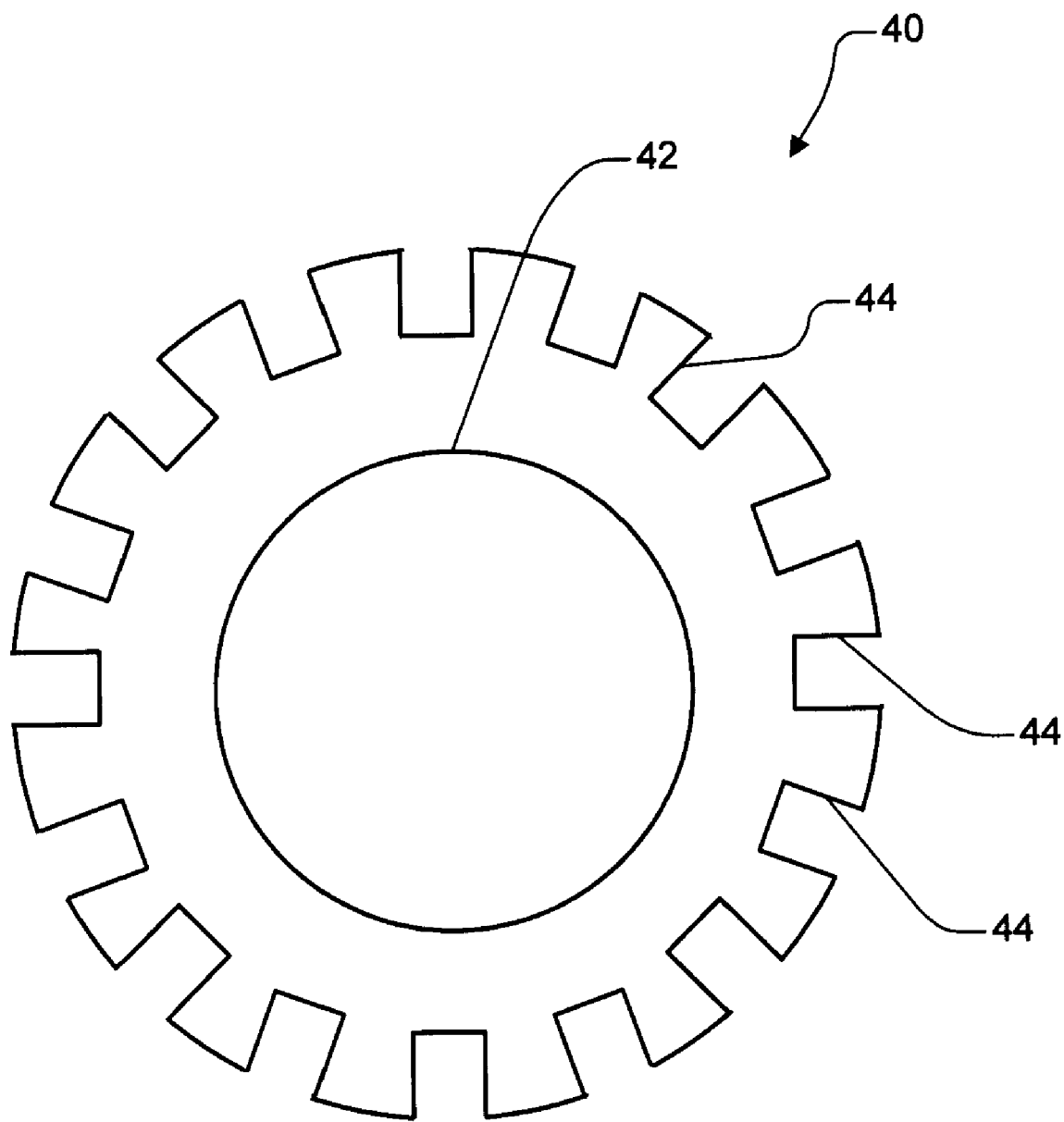
FIG. 5 is a top view of a variant of a metal sheet of a squirrel-cage rotor in accordance with the teachings of the present disclosure.

Referring to FIG. 5, a variant form of a metal sheet 40 may include a central opening 42 and a plurality of cutouts 44 that are open to the peripheral edges. It is noted that the apertures 32 and the cutouts 44 of FIGS. 4 and 5, respectively, are shown for illustration only and the number of the apertures 28 and the cutouts 44 may not be consistent with the number elongated slots illustrated in FIG. 3.

The rotor bars 16 and the end rings are formed with electrically conductive materials. The rotor bars 16 and the end rings 18 may include, for example only, copper alloy or aluminum alloy. The rotor bars 16 may be formed, for example only, by extrusion, stamping or machining. The end rings 28 may be formed, for example only, by die casting. For example only, the rotor bars 16 may be produced in extruded rods made of aluminum alloy 6101 and the end rings may be produced by die-casting aluminum alloy 6061. Aluminum alloy 6101 has greater electrical conductivity than aluminum alloy 6061, whereas aluminum alloy 6061 has greater mechanical strength than aluminum alloy 6101.

Figure 6:
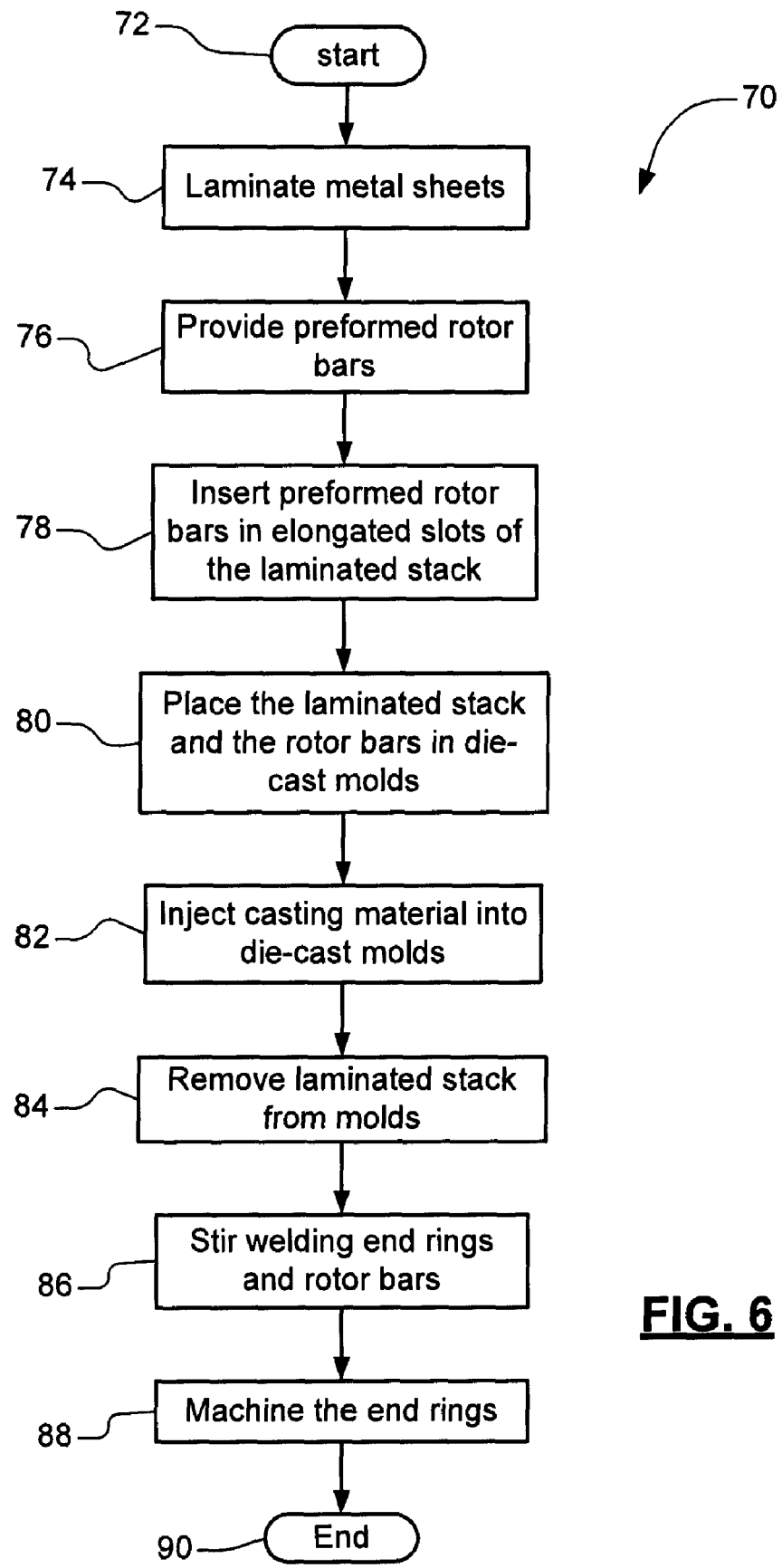
FIG. 6 is a flow diagram illustrating a method of manufacturing a squirrel-cage rotor in accordance with the teachings of the present disclosure.

Referring to FIG. 6, a method 70 of manufacturing a squirrel-cage rotor starts in step 72. A plurality of metal sheets are laminated to form a laminated stack in step 74. The central openings of the metal sheets are aligned to form a central slot for the rotatable shaft. The peripheral apertures are aligned to form a plurality of bar slots. A plurality of rotor bars are pre-formed, for example only, by extrusion in step 76. The preformed rotor bars are inserted into the bar slots to form a sub-assembly in step 78. The longitudinal ends of the rotor bars protrude from the longitudinal ends of the laminated stack. The sub-assembly is placed in a set of die cast molds that define cavities for forming end rings in step 80. A molten casting material is injected into the die cast molds to fill in the cavities in step 82. When the molten material is solidified, the end rings are formed and may be partially joined to the rotor bars 16.

The rotor assembly that includes the rotor core 14, the rotor bars 16, and the end rings 18 is removed from the molds in step 84. Stir-welding is applied to the interfaces between the rotor bars 16 and the end rings 18 in step 86. During friction-stir-welding, a welding fixture (not shown) may be used to retain the end rings 18 in position relative to the longitudinal ends 20 of the rotor bars 16. The rotor bars 16 are placed perpendicular to the end rings 18 and are inserted into the end rings 18.

Stir welding is a solid-state joining process wherein frictional heat is generated to cause opposed portions of workpieces to take up a plasticized condition. When a spinning probe that causes the frictional heat is removed, the plasticized portions solidify and join the workpieces. The weld joints 22 may be formed by stir-welding and may be formed at the interface between the rotor bars 16 and the end rings 18. For example only, the weld joints 22 may be formed around the circumference of the end rings 18 and/or peripheries of the rotor bars 16. The end rings 18 are later machined to provide smooth weld joints in step 88. If the end rings 18 have an outside diameter greater than that of the laminated stack 14, the end rings 18 may be machined to have an outside diameter approximate to the outside diameter of the laminated stack. The method 70 ends in the step 90.

The squirrel-cage rotor manufactured by the method of the present disclosure has preformed rotor bars and die-cast end rings. According to the method of the present disclosure, the rotor bars may be made of a material that has a greater electrical conductivity than that of the end rings. Therefore, the method of manufacturing a squirrel-cage rotor according to the present disclosure allows for wide selection of materials while increasing integrity of the rotor bars and the end rings.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of manufacturing a squirrel-cage rotor of an electric motor, comprising:
    laminating a plurality of steel sheets to form a laminated stack for the squirrel-cage rotor,
    the laminated stack defining a plurality of elongated slots that are spaced circumferentially around the laminated stack;
    forming a plurality of rotor bars for the squirrel-cage rotor from a first material by extrusion,
    wherein the first material is aluminum alloy 6101;
    attaching the plurality of rotor bars to the laminated stack, wherein attaching the plurality of rotor bars to the laminated stack includes inserting the rotor bars into the plurality of elongated slots, respectively, and
    wherein the plurality of rotor bars each include opposite longitudinal ends,
    wherein the longitudinal ends of the rotor bars extend beyond longitudinal ends of the laminated stack;
    placing the laminated stack and the plurality of rotor bars in a set of molds;
    die-casting, using the set of molds, a pair of end rings for the squirrel-cage rotor from a second material at the longitudinal ends of the plurality of rotor bars,
    wherein the first material is different from the second material,
    and wherein the second material is aluminum alloy 6061;
    stir welding the longitudinal ends of the rotor bars to the end rings,
    the stir welding forming weld joints at interfaces between the rotor bars and the end rings; and
    smoothing the weld joints formed by the stir welding.

* * * * *